US005556017A

United States Patent [19]
Troy

[11] Patent Number: 5,556,017
[45] Date of Patent: Sep. 17, 1996

[54] HINGED PHONE BRACKET FOR VEHICLE

[75] Inventor: Stanton E. Troy, Kokomo, Ind.

[73] Assignee: Delco Electronics Corporation, Kokomo, Ind.

[21] Appl. No.: 391,799

[22] Filed: Feb. 21, 1995

[51] Int. Cl.$^6$ .................. B60R 7/00; B60R 7/10; B60R 9/00; B60R 11/00
[52] U.S. Cl. .................. 224/549; 224/275; 224/281; 224/282; 224/545; 224/548; 224/553; 224/929; 248/286.1; 379/446; 379/453; 379/454; 379/455; 297/188.01; 297/188.14; 297/188.15; 297/188.16; 297/188.17; 455/90
[58] Field of Search .................. 224/275, 281, 224/282, 311, 544, 545, 548, 549, 553–556, 929; 248/279.1, 286.1, 284.1, 310; 297/188.14, 188.15, 188.16, 188.17, 188.01, 188.04; 379/446, 449, 454, 455, 441, 451, 453; 455/90

[56] References Cited

U.S. PATENT DOCUMENTS

| | | | |
|---|---|---|---|
| 1,626,287 | 4/1927 | Kinkead | 379/453 |
| 2,007,858 | 7/1935 | Hartson | 379/453 |
| 2,663,764 | 12/1953 | Holmes | 248/279.1 |
| 2,770,682 | 11/1956 | Malone | 379/455 |
| 4,797,916 | 1/1989 | Kojima | 379/454 |
| 5,060,260 | 10/1991 | O'Connell | 379/455 |
| 5,109,411 | 4/1992 | O'Connell | 224/929 |
| 5,372,403 | 12/1994 | Puerto | 297/188.17 |

*Primary Examiner*—Henry J. Recla
*Assistant Examiner*—Timothy L. Maust
*Attorney, Agent, or Firm*—Jimmy L. Funke

[57] ABSTRACT

To store a mobile phone in the console bin of a vehicle and easily swing it out and hold it in a working position, a bracket mounted on an inner top wall of the bin has a link hinged at both ends for coupling a main phone support to the mount and a slide on the main support for holding the phone. The hinged link allows the phone to swing in and out of the bin between working and storage positions, and the slide permits the phone to be moved further from the bin to allow the bin cover to close. The phone comprises a cradle attached to the slide and a removable handset which may be left in the cradle for use as held by the bracket.

3 Claims, 2 Drawing Sheets

5,556,017

HINGED PHONE BRACKET FOR VEHICLE

FIELD OF THE INVENTION

This invention relates to a bracket for adjustably mounting an article to a support and particularly to a telephone support bracket for rotational and sliding movement between storage and working positions.

BACKGROUND OF THE INVENTION

The use of cellular or other mobile telephones in vehicles provides a challenge to properly store a phone handset while keeping it easily available for use by the vehicle operator. Often phones are merely set on a seat where they are not securely fastened and are not necessarily conveniently located for use. It is preferred that a phone base be held securely for hands-free use by the user; for that purpose it must be easy to reach as well as stable.

Here it is desired to store the instrument in an existing vehicle compartment and to have it removable from the compartment and held for hands-free use. A console bin between front bucket seats provides an opportunity for such storage although such compartments are not always positioned for easy access. Also, when a phone is stored in a compartment, the cover should close normally, and when the phone is removed and held in its working position, the cover should be able to close or nearly close.

SUMMARY OF THE INVENTION

It is therefore an object of the invention to securely hold a phone in a vehicle and to controllably move the phone to a storage bin. Another object is to move a phone from a storage bin to a location convenient for use. A further object is to store a phone in a covered bin and upon removal to permit a cover to be at least partially closed.

A console bin in a vehicle adjacent the leg of a seated operator offers storage for a phone. The phone is mounted on a hinged bracket secured in the bin and swings out in a forward direction to a working position. In the case where the operator's seat is in a forward position, it is desirable for the phone to be positioned sufficiently forward for convenient access. A slide on the bracket extends the phone forward for use and allows the phone to be moved back, compressing the bracket/phone package for storage. The bracket is double-hinged for compact folding and versatile movement between storage and working positions. Since the bracket extends through the bin opening the door cannot be closed, but due to the slide the phone is moved away from the door so that the door can nearly close, being slightly obstructed by the bracket.

The bracket has a mounting plate to be secured to the top wall of the bin, an angular link hinged by a first hinge to one end of the plate and hinged by a second hinge to the rear end of a phone support. The angular link extends through the bin opening so that the phone support is outside the bin. The forward end of the phone support is a slide which is tilted at an angle for holding the phone at an ergonometrically correct position. The slide comprises a channel which is a fixed part of the support and a slide plate which telescopes within the channel and which includes a mounting surface for holding the phone.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
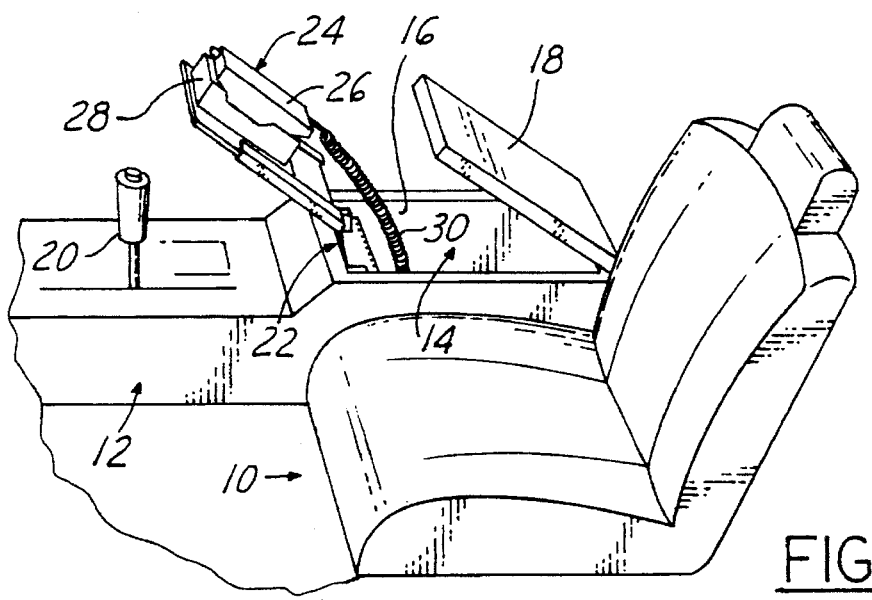
FIG. 1 is an isometric view of a mobile telephone installed on a bracket mounted in a vehicle storage bin, according to the invention.

Referring to FIG. 1 which shows a portion of a vehicle interior including a seat 10 and a console 12, a storage bin 14 in the console 12 alongside the seat 10 has a top opening 16 and a cover 18 hinged at the rear to the console for closing the opening. A gear shift lever 20 is located on the console forward of the bin 14. As better shown in FIG. 2, a bracket 22 is mounted inside the bin and extends through the opening to a position above the shift lever 20 to support a phone 24. The phone includes a handset 26 and a cradle 28. A coiled cord 30 extends from the cradle into the bin and is connected to a 3 watt booster (not shown) for enhanced communication when the handset is seated in the cradle.

Figure 2:
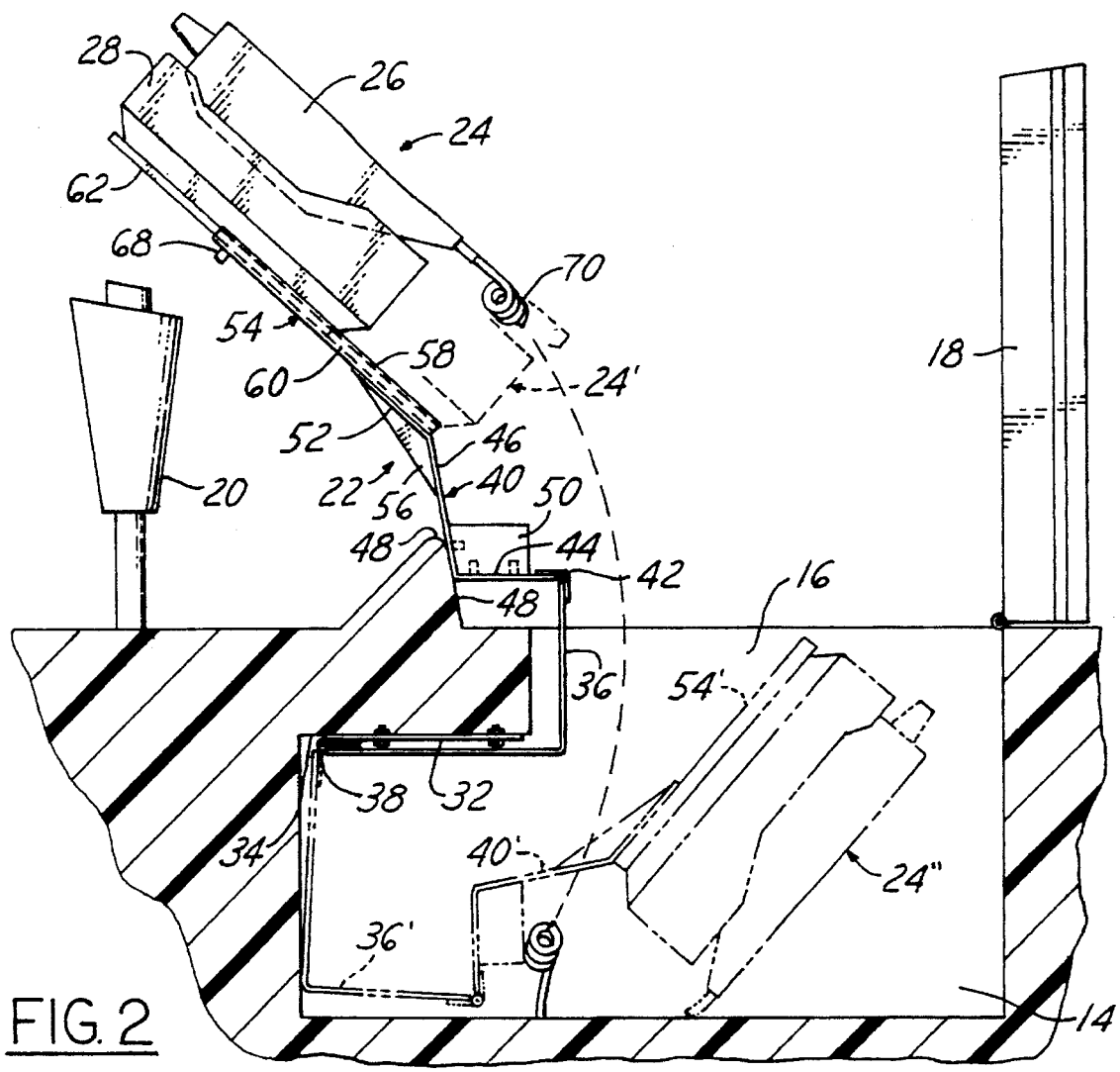
FIG. 2 is a side view of the bracket as installed in a vehicle storage bin according to FIG. 1.
Figure 3:
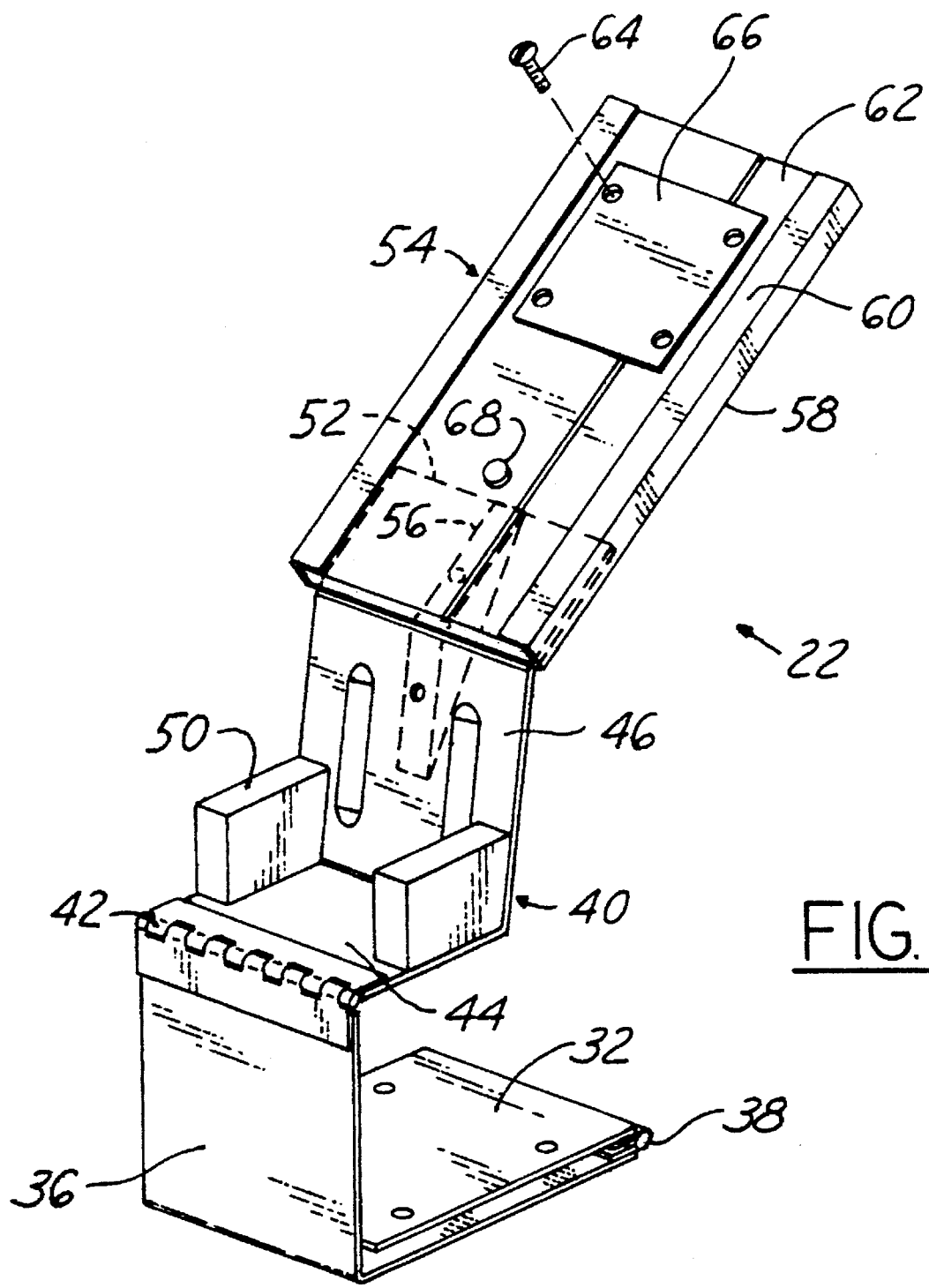
FIG. 3 is an isometric view of the bracket of FIG. 1, according to the invention.

FIGS. 2 and 3 illustrate the bracket 22 which is shown in phone working position and described here as such. The bracket has a mounting plate 32 fastened by screws to the top inner wall 34 of the bin 14, an angle link 36 which is pivotally joined at one end to the mounting plate 32 by a hinge 38, and is further pivotally joined at the opposite end to a main support 40 by a second hinge 42. The angle link 36 forms a right angle which reaches around the top wall 34 of the bin and extends up to the bin opening. The support 40 also has an angled section comprising a horizontal run 44 and a nearly vertical riser 46 which bears against an upper edge 48 of the opening. A pair of gussets 50 reinforce the angle formed by the run 44 and riser 46. An upper angled flange 52 oriented in the desired plane of the phone 24 and extending from the riser 46 is secured to a slide 54. Another gusset 56 reinforces the angle of the flange 52 and the riser 46. The slide 54 includes a channel 58 having in-turned side flanges 60, and a slide plate 62 which telescopically joins the channel for translational motion. The phone 24 is attached to the slide plate 62 by four screws 64 which extend through the cradle 28 and thread into the plate 62. A spacer plate 66 sandwiched between the cradle and the slide plate 62 positions the phone to assure clearance from the channel 58. The channel has a slot, not shown, parallel to the sliding movement of the slide and a button 68 in the slide plate 62 protrudes into the channel to limit the slide movement. A coiled cord 70 extends from the handset to the bin.

FIG. 2 shows the bracket and phone in working position in solid lines and storage position in phantom lines. In working position the user slides the phone forward for use, preferably to the limit of the slide range for easy access for hands-free use or for removal of the handset from the cradle. In this forward position the cover 18 of the bin 14 can be nearly closed, held slightly open by the bracket 22 and cord 70. To store the phone, it is slid to the rear, as indicated by phantom lines 24' by operation of the slide 54, and then folded into the bin to the storage position shown in phantom lines 24". To fold the bracket it is first rotated about the hinge 38 until the angle plate 36 reaches its fully stored position shown at 36', the other hinge 42 allows the main support 40 to fold slightly forward toward the angle plate; then when the angle plate reaches the limit position, the main support 40 rotates the opposite direction about hinge 42 to place the phone wholly in the bin 14.

It will thus be seen that the folding and sliding action of the bracket permits convenient usage of the phone with the bin cover substantially closed and also allows compact storage. With the bin cover so closed and used as an arm rest, the phone is in an ergonomically correct position to use when the slide is extended.

The embodiments of the invention in which an exclusive property or privilege is claimed are defined as follows:

1. A phone installation comprising:

a storage bin having a top opening and an upper inner surface adjacent the opening;

bracket means for supporting a phone for movement between an operating position outside the bin and a storage position within the bin including
   a mount attached to the upper inner surface of the bin,
   a slide adapted to hold the phone for sliding the phone between extended and withdrawn positions,
   a single link having one end directly hinged to the mount and the other end directly hinged to the slide;

whereby the slide is movable from storage position to operating position by pivoting the slide to a position outside the bin and extending the slide to operating position.

2. The invention as defined in claim 1 wherein:

the mount is a flat plate; and the single link is a plate having a substantially right angle bend.

3. The invention as defined in claim 1 wherein:

the mount is a flat plate extending from the opening to an end remote from the opening;

the single link is a plate having substantially a right angle bend defining two flat portions; and one flat portion is hinged to the mount at the remote end and the other flat portion extends through the opening when in operating position.

* * * * *